United States Patent

Mizoguchi et al.

[11] 4,414,424
[45] Nov. 8, 1983

[54] GAS-INSULATED BUS BAR

[75] Inventors: Tetsuhiko Mizoguchi; Akio Koyama, both of Yokohama, Japan

[73] Assignee: Tokyo Shibaura Denki Kabushiki Kaisha, Kawasaki, Japan

[21] Appl. No.: 312,726

[22] Filed: Oct. 19, 1981

[30] Foreign Application Priority Data

Oct. 20, 1980 [JP] Japan .................. 55-149299[U]

[51] Int. Cl.³ .................. H02G 5/06; H01B 9/04
[52] U.S. Cl. .................. 174/28; 174/99 B
[58] Field of Search .............. 174/16 B, 27, 28, 99 R, 174/99 B, 99 E, 148, 149 B; 138/108, 112, 113, 114

[56] References Cited

U.S. PATENT DOCUMENTS

| 2,428,051 | 9/1947 | Touraton | 174/99 R X |
| 4,084,064 | 4/1978 | Bowman | 174/16 B X |
| 4,296,271 | 10/1981 | Floessel | 174/99 B X |

FOREIGN PATENT DOCUMENTS 2036270 1/1972 Fed. Rep. of Germany ........ 174/27
54-158681 12/1979 Japan ........................ 174/28

Primary Examiner—Laramie E. Askin
Attorney, Agent, or Firm—Oblon, Fisher, Spivak, McClelland & Maier

[57] ABSTRACT

A gas-insulated bus bar, wherein each end of a plurality of support arms for holding bus conductors substantially in the center of a case which faces the inner peripheral wall of the case is fitted with a metal member whose end spatially faces the inner peripheral wall of the case; an annular groove is formed in the end portion of the metal member; an annular sliding member prepared from an elastic electrically insulating synthetic resin capable of easily sliding over the inner peripheral wall of the case is inserted into the annular groove in a state to project from the end of the metal member to be pressed against the inner peripheral wall of the case; a radially extending hole open to the inner peripheral wall of the case is formed in said end of the metal member; a metal button is inserted into said hole in a state urged toward the inner peripheral wall of the case; and the support arms are elastically pressed against the inner peripheral wall of the case.

3 Claims, 7 Drawing Figures

GAS-INSULATED BUS BAR

BACKGROUND OF THE INVENTION

This invention relates to a gas-insulated bus bar which comprises:

a case filled with electric insulation high pressure gas;

a bus conductor supported in the case substantially coaxially therewith; and a support arm which is positioned between the bus conductor and case to support the bus conductor in such a manner that said bus conductor extends substantially axially of the case. The above-mentioned type of gas-insulated bus bar is already known.

FIG. 1 shows a cross section of the prior art gas-insulated bus bar. A metal cylindrical case 10 usually electrically grounded is filled with an electric insulation high pressure gas such as sulfur hexafluoride ($SF_6$). A metal pipe bus conductor 12 is securely held in the substantially cross sectional center of the case 10 by a plurality (three in FIG. 1) of support arms 14 which are connected at one end to the bus conductor 12 and at the other end to the case 10 substantially equidistantly in the circumferential direction of the case 10. The support arm 14 comprises an embedded metal member 14a welded or airtightly screwed to the inner peripheral wall of the case 10 and an electrically insulating support rod 14b, in the outer end portion of which the embedded metal member 14a is cast.

The conventional gas-insulated bus conductor 12 constructed as described above is generally supposed to have the drawbacks that the bus conductor 12 is excessively elongated relative to the case 10 in accordance with changes in ambient temperature or in the heated condition of the various parts of the bus conductor 12 itself; the resultant bending load causes the support arms 14 to be more extended to undergo an axial stress; and consequently the support arms 14, particularly mechanically weak electrically insulating support rods 14b are likely to be broken; and said breakage of the support rods 14b gives rise to objectionable events such as a decline in the electric insulating property of a gas-insulated bus bar and consequently a decrease in the power-transmitting property of the entire power transmission line using such defective bus bar.

SUMMARY OF THE INVENTION

It is accordingly the object of this invention to provide a gas-insulated bus bar which is free from drawbacks encountered with the conventional gas-insulated bus bar and saved from damage resulting from temperature change.

To attain the above-mentioned object, this invention provides a gas-insulated bus bar wherein each of the support arms comprises a proximal support member which is provided with an insulation member, one end of which is fitted to the bus conductor and a low voltage shield fixed to the other end of said insulation member; and a distal support member which is provided with an electric contact which is electrically connected to the low voltage shield and elastically and slidably contacts the inner peripheral wall of a cylindrical case, a metal member which touches the end of the low voltage shield and is provided with a cavity open to the inner peripheral wall of the cylindrical case, and an elastic electrically insulating member which is slidably pressed against the inner peripheral wall of the cylindrical case.

A gas-insulated bus bar embodying this invention which is constructed as described above has the advantages that where the bus conductor expands to a different extent from the cylindrical case in accordance with changes in ambient temperature or in the heated condition of the various parts of the bus bar itself, then the slidable member set at the end of the support arm slides along the inner peripheral wall of the cylindrical case, thereby preventing the support arm from being bent; and further where the support arm expands to a greater extent than a space defined between the central bus conductor and the inner peripheral wall of the cylindrical case, then said expansion is absorbed by the elastic contraction of the slidable member slidably pressed against the inner peripheral wall of the cylindrical case, thereby effectively preventing the breakage of the support arm which has hitherto resulted from temperature change, and consequently elevating the reliability of power transmission network using the gas-insulated bus bar of the invention.

DETAILED DESCRIPTION OF THE PREFERRED EMBODIMENTS

Figure 2:
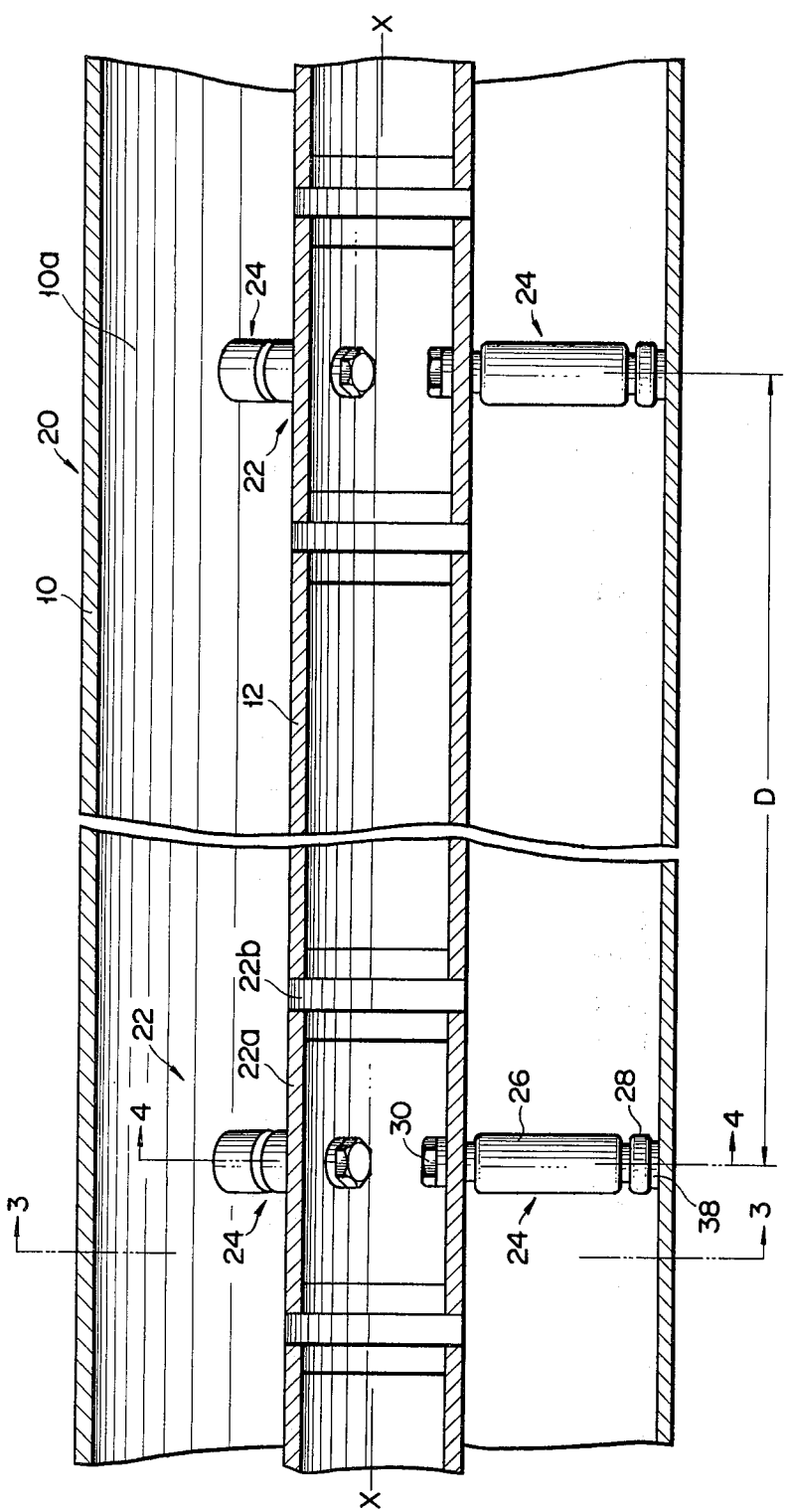
FIG. 2 is a partial longitudinal sectional view as taken from a plane including the axial line of a gas-insulated bus bar embodying this invention.

FIG. 2 is a fractional longitudinal sectional view of a cylindrical case 10 and bus conductor 12 as taken from a plane including the axis X—X of a gas-insulated bus bar 20 embodying this invention. A plurality of support units 22 are connected to the bus conductor 12 at a prescribed interval D. Each support unit 22 comprises a coupling conductor 22a having substantially the same cross sectional form as the bus conductor 12, a connection member 22b for coupling both ends of said coupling conductor 22a to bus conductor elements set on both sides of said coupling conductor 22a, and three support arms 24 disposed between the coupling conductor 22a and the inner peripheral wall of the case 10. The support arms 24 are spaced radially from the X—X axis of the case 10 on a plane perpendicular to said X—X axis equidistantly in the circumferential direction of the case 10, that is, substantially at an angle of 120°. The case 10 is filled with pressurized electrically insulating gas 10a such as sulfur hexafluoride ($SF_6$).

Figure 1:
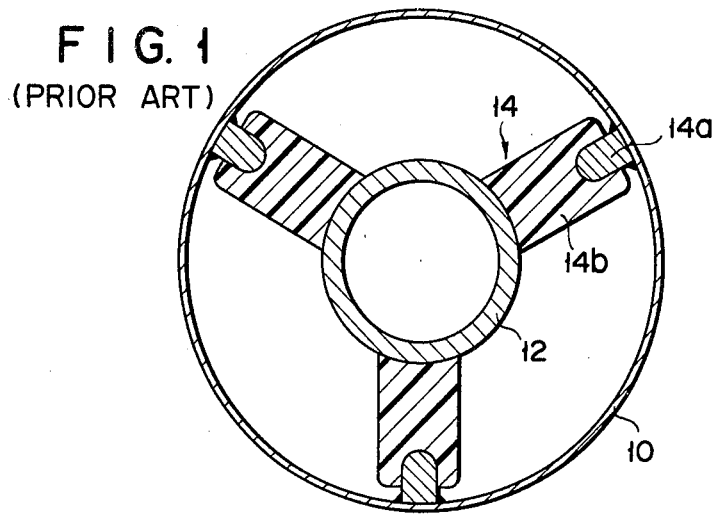
FIG. 1 is a cross sectional view of the conventional gas-insulated bus bar.
Figure 3:
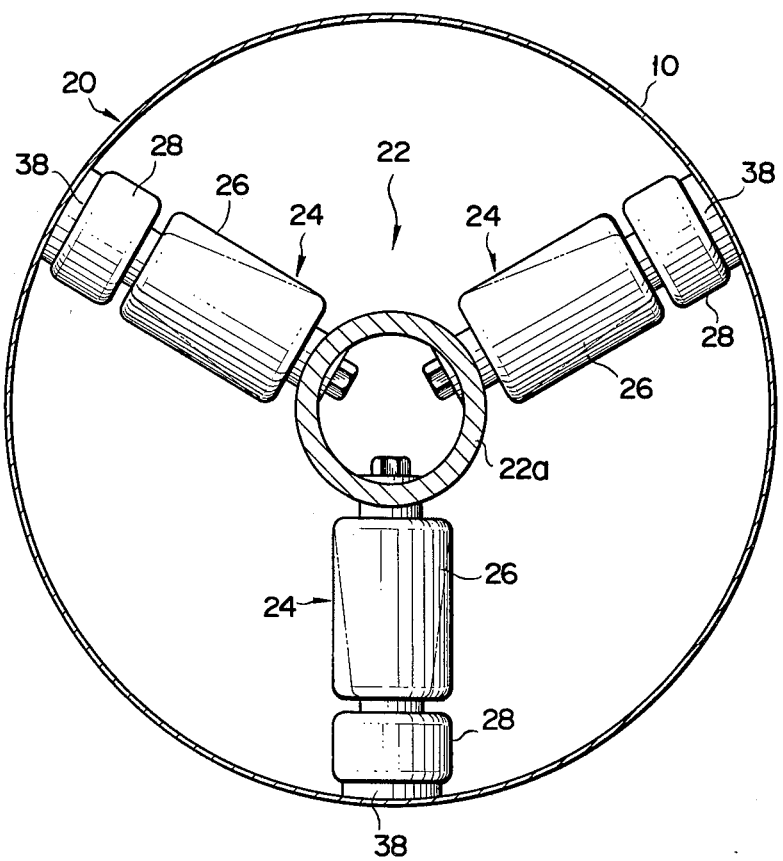
FIG. 3 is a cross sectional view on line 3—3 of FIG. 2.
Figure 4:
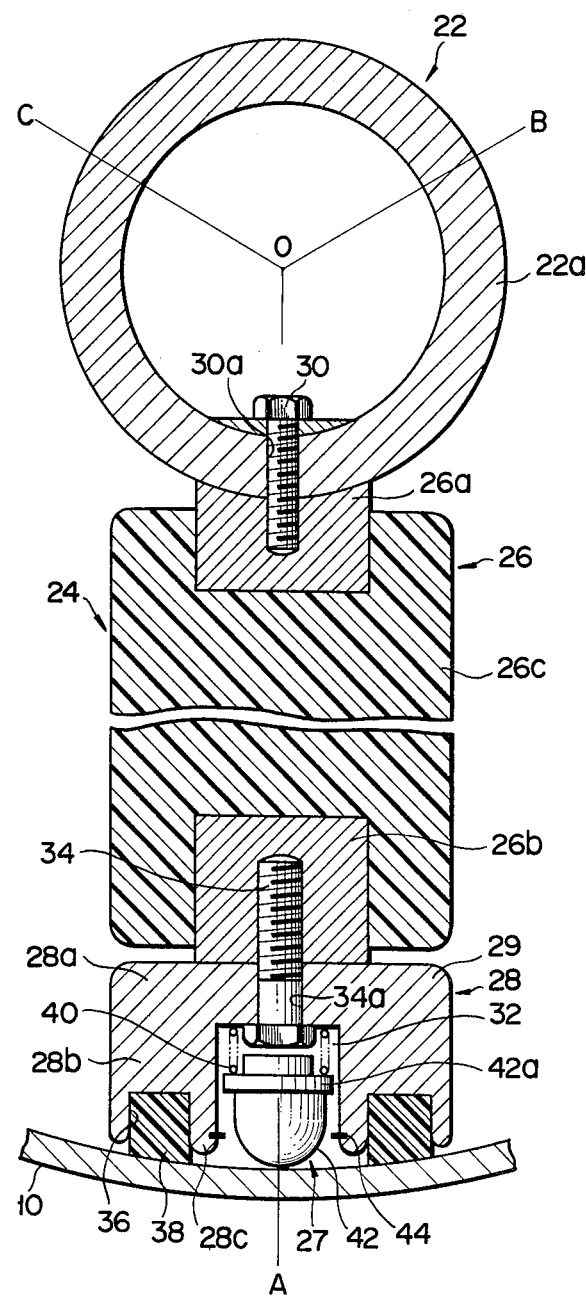
FIG. 4 is a cross sectional view on line 4—4 of FIG. 2.

FIG. 3 is a cross sectional view on line 3—3 of FIG. 2, showing the relative positions of the case 10, bus conductor 12 and three support arms 24 as taken from a plane perpendicular to the X—X axis of the case 10. FIG. 4 is a cross sectional view on line 4—4 of FIG. 2. Actually, three support arms 24 should be indicated which are spaced from each other at an angle of 120° in the circumferential direction of the case 10. Since, however, they have the same construction, FIG. 4 indicates only the support arm 24 extending from the center O of the bus bar conductor 12 in a radial direction, that is, along an OA line. FIG. 4 shows only OB and OC lines along which the other two support arms 24 (not shown) extend. The coupling conductor 22 for connecting every adjacent bus conductors 12 are supported by the three support arms 24 substantially coaxially with the case 10. As previously described, each support arm 24 comprises a proximal support member 26 fixed to the coupling conductor 22a and a distal support member 28 which is fitted to said proximal support member 26 and whose outer end is pressed against the inner peripheral wall of the case 10. The proximal support member 26 comprises a columnar electrically insulating member 26c prepared from plastic material, an embedded metal member 26a embedded in the electrically insulating member 26c to be fixed to the coupling conductor 22a and a low voltage shield 26b which is embedded in that end of the electrically insulating member 26c which faces the case 10 in a state partly projecting from the end. The proximal support member 26 is fixed to the coupling conductor 22a by threadedly inserting a fitting screw 30 into the embedded metal member 26a through a hole 30a penetrating the coupling conductor 22a.

The distal support member 28 comprises a metal member 29, sliding member 38, metal button 42 and elastic compression coil spring 40. The metal button 42 and compression coil spring 40 jointly constitute an electric connection member 27 which electrically connects the pipe case 10, the low voltage shield 26b to the metal member 29 which comprises an annular wall 28b and a bottom plate 28a. The bottom plate 28a pressed against the lower end (FIG. 4) of the low voltage shield 26b, and the annular peripheral wall 28b projecting from said bottom plate 28a in the direction of the OA line. A cylindrical hole 32 bored radially of the cylindrical case 10 (hereinafter referred to as "the radially extending hole 32") is defined inside of the annular wall 28b. An annular groove 36 is formed inside of that end portion 28c of the annular wall 28b which faces the inner peripheral wall of the case 10.

The metal member 29 is fitted to the low voltage shield 26b by threadedly inserting a fitting screw 34 into the low voltage shield 26b through a hole 34a penetrating the bottom plate 28a substantially coaxially with the OA line, thereby causing the distal support member 28 and proximal support member 26 to be connected together. The sliding member 38 is fitted into the annular groove 36 formed in the aforesaid end portion 28c of the metal member 29 to project toward the inner peripheral wall of the case 10 for slidable contact therewith. The sliding member 38 is formed of a material such as Teflon (trademark) which has a high electrically insulating property and elasticity and a smooth sliding property with respect to the inner peripheral wall of the case 10. Received in the radially extending hole 32 of the metal member 29 are the compression coil spring 40 and the metal button 42 whose outer end is made into a semispherical form. The end of the metal button 42 projects from the radially extending hole 32. The opening of the radially extending hole 32 is fitted with a snap ring 44. The metal button 42 is provided with a flange 42a. The compression coil spring 40 downward urges the metal button 42 by means of said flange 42a. Therefore, the metal button 42 which is originally made to slide vertically through the radially extending hole 32 always tends to be moved downward by the urging force of the compression coil spring 40. However, the descent of the metal button 42 is stopped at a point at which the flange 42a is engaged with the snap ring 44, that is, a point at which the metal button 42 projects downward from the end portion 28c of the aforesaid annular wall 28b. Therefore, the metal button 42 is prevented from being thrown out of the radially extending hole 32. When projecting from the radially extending hole 32, the end of the metal button 42 contacts the inner peripheral wall of the cylindrical case 10. Accordingly, the low voltage shield 26b has the same potential as the metal button 42 and consequently the pipe case 10 through the fitting screw 34, metal member 29 and compression coil spring 40.

The coupling conductor 22a, proximal support member 26 and distal support member 28 are connected together by the fitting screws 30, 34 to constitute a support unit 22 having three support arms 24. Every adjacent bus conductors 12 are previously connected together by said support unit 22 at a prescribed interval D (FIG. 2) outside of the case 10. Later, the connected bus conductors 12 and the support units 22 are drawn into the case 10. Then the connected bus conductors 12 are held in the pipe case 10 substantially coaxially therewith, under the condition in which the support arms 24 of the respective bus conductors 12 are pressed against the inner peripheral wall of the pipe case 10 by the elastic synthetic resin sliding member 38 and the metal button 42 urged by the compression coil spring 40. In this case, the force with which the support arms 24 are pressed against the inner peripheral wall of the pipe case 10 is mainly exerted by said elastic synthetic resin sliding member 38. This elastic sliding member 38 is deformable to a certain extent under load, and has a smoothly sliding property. The metal button 42 can be elastically moved vertically under load. Therefore, each support unit 22 is easily inserted into the case 10, giving rise to no possibility that the metal button 42 and case 10 are prevented from sliding over each other with a great pressing force and consequently suppressing the occurrence of scratches between the metal button 42 and case 10 when the bus bar conductors 12 are inserted into the case 10. Further, metal scraps produced between the metal button 42 and case 10 due to the mutual sliding are accumulated inside of the annular sliding member 38, preventing insulation between the case 10 and bus conductors 12 from being reduced due to the pressure of said metal scraps.

Description is now given of the condition of the gas-insulated bus bar of this invention when temperature increase arises therein. Even where said temperature rise causes the bus conductors 12 to be thermally expanded to a greater extent than the case 10, the support arms 24 whose end portions are made to slide along the inner peripheral wall of the case 10, are not subject to a bending stress, thereby suppressing the damage of said support arms 24, particularly the electrically insulating plastic members 26c. Where a compressive force is applied to the support arms 24 when they are elongated due to temperature rise, the compressive force is absorbed by the elasticity of the plastic sliding members 38 fitted to the end portions of the support arms 24 and the compression coil springs 40, thereby saving the support arms 24 from damage.

The main metal members used as the various components of the gas-insulated bus bar of this invention include the following:

| | |
|---|---|
| Case 10 | aluminum of iron |
| Bus conductor 12 | copper or aluminum |
| Embedded metal member 26a | aluminum, stainless steel or brass |
| Low voltage shield 26b | aluminum, stainless steel or brass |
| Bottom plate 28a | aluminum, stainless steel, iron or brass |
| Annular wall 28b | |
| Metal button 42 | iron, aluminum, stainless steel or brass |
| Compression coil spring 40 | stainless steel or iron |
| Fitting screws 30, 34 | iron or stainless steel |

Figure 5:
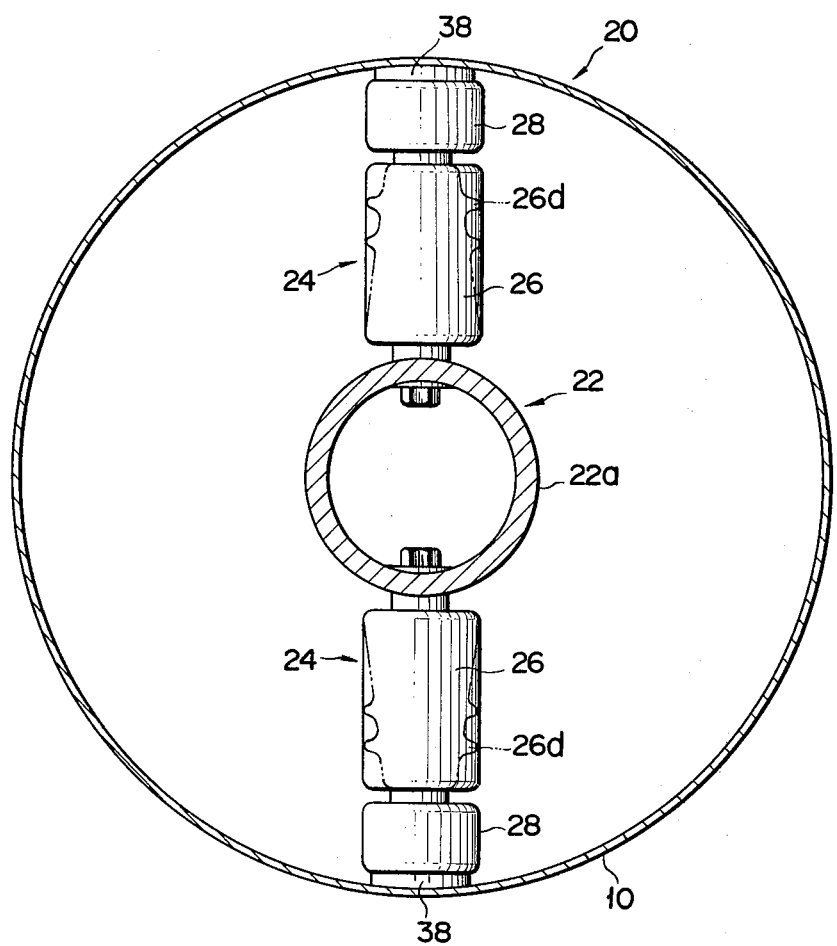
FIG. 5 is a fractional cross sectional view of a gas-insulated bus bar according to another embodiment of the invention.

With the foregoing embodiment, each support unit 22 (FIG. 2) comprised three support arms 24. Obviously, the number of the support arms 24 can be changed in accordance with the size of a gas-insulated bus bar, the ambient condition and the other conditions in which the subject bus bar is applied. For instance, FIG. 5 indicates another embodiment in which two support arms 24 are provided for each bus conductor. The parts of FIG. 5 the same as those of FIG. 3 are denoted by the same reference numerals. The plastic electrically insulating member 26c of the proximal support member 26 shown in FIG. 4 had a round columnar form. However, this form need not be exclusively followed. As shown in two dots-dash lines in FIGS. 3 and 5, the plastic electrically insulating member 26c may take a round conical form. In this case, the portion of the round conical electrically insulating member 26c which faces the coupling conductor 22a is made thicker than that portion of the round conical electrically insulating member 26c which faces the distal support member 28. Referring to FIG. 5, a plurality of annular projections 26d formed on the outer peripheral wall of the round conical electrically insulating member 26c of the proximal support member 26 exemplify undulations for increasing the creeping distance of the gas-insulated bus bar. Though omitted in FIGS. 2, 3, 4, 6 and 7, the annular projections 26d may obviously be provided.

Figure 6:
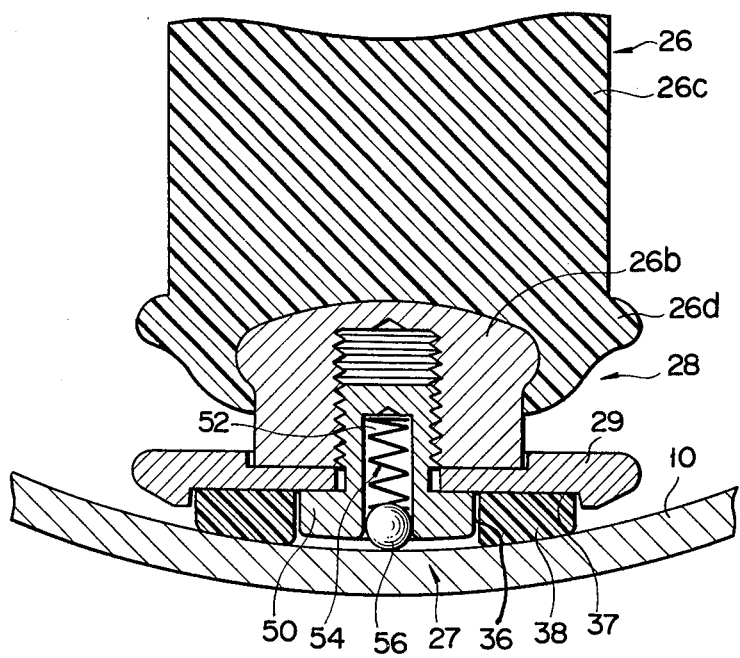
FIG. 6 shows a distal support member different from that of FIG. 4.

FIG. 6 illustrates a proximal support member 26 according to a different embodiment from that of FIG. 4. In the embodiment of FIG. 6, a plurality of annular projections 26d (though only one shown in FIG. 6) are provided around the lower end portion of the proximal support member 26. A metal screw 50 is threadedly inserted into the lower end portion of the low voltage shield 26b. A relatively thin metal member 29 is clamped between the head section of the metal screw 50 and the low voltage shield 26b. A cavity 36 having a flat bottom 37 is formed on the underside of the thin metal member 29. A sliding member 38 is fitted into the cavity 36 to enclose the head section of the metal screw 50. As described with reference to FIG. 4, the plastic sliding member 38 is prepared from, for example, Teflon (trademark). The sliding member 38 is clamped between the inner peripheral wall of case 10 and the flat bottom 37 of the cavity 36 of the metal member 29 in a state slidable along the inner peripheral wall of the case 10. The metal screw 50 is provided with a radially extending hole 52 open to the inner peripheral wall of the case 10. Received in the hole 52 are an elastic compression coil spring 54 and a metal contact ball 56. The contact ball 56 pushed by the compression coil spring 54 projects from the radially extending hole 52 to contact the inner peripheral wall of the case 10. The embodiment of FIG. 6 using the support arm comprising the above-mentioned proximal support member 26 has the same advantages as in the embodiment of FIG. 4 that the support arm is not damaged by temperature rise and no scratches are produced on the inner peripheral wall of the case 10 when the support arm 24 slides along said inner peripheral wall.

Figure 7:
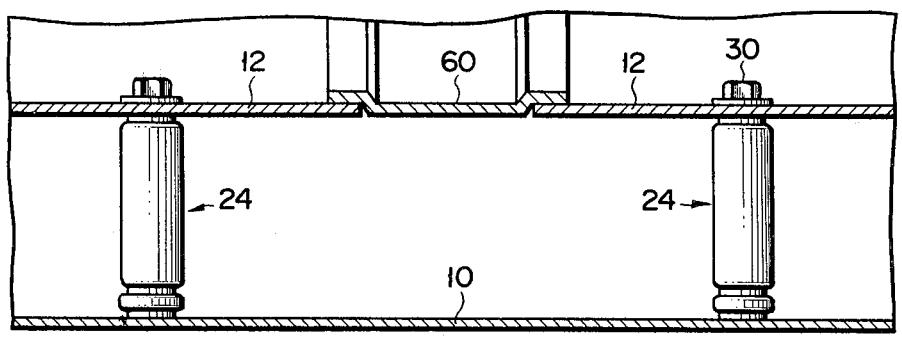
FIG. 7 illustrates support arms arranged in a different manner from FIG. 2.

Description is now given with reference to FIG. 7 of still another embodiment in which the bus conductor 12 is supported on the inner peripheral wall of the case 10 in a different manner from FIG. 2. FIG. 7 shows the longitudinal sectional view of the lower half of a gas-insulated bus bar as taken from a plane including the axis of the bus bar. In this lower half section, the support arms 24 are fitted to the bus conductors 12 at a prescribed interval. Every adjacent bus conductors are connected by a coupling ring 60 at an intermediate point between every adjacent support arms 24. The coupling ring 60 is fitted to the adjacent bus conductors 12 by any proper known process such as welding or screwing. FIG. 3 shows three support arms 24 as viewed crosswise of the bus conductor, and FIG. 5 indicates two support arms 24 as viewed similarly crosswise of the bus conductor 12. However, it is not necessary to fit a plurality of support arms 24 to each bus conductor 12. Namely, as shown in FIG. 7, a single support arm 24 may be provided for each bus conductor 12. In this case all of the single support arms 24 may not be extended in a same radial direction from the respective bus conductor element but in different radial directions. Further the support units 22, for example shown in FIG. 3 and 5, may be arranged in a relationship in which desired adjacent units 22 are angularly shifted in a plane perpendicular to the axis of the case 10.

What we claim is:

1. A gas-insulated bus bar, which comprises:
   a case filled with highly pressurized electrically insulating gas;
   bus conductors supported in the case substantially coaxially therewith; and
   a plurality of support arms fitted to the bus conductors to let them extend substantially coaxially with the case,
   wherein each support arm comprises:
   a proximal support member which is provided with an electrically insulating member, one end of which is fitted to the bus conductor, and a low voltage shield fitted to the other end of said electrically insulating member; and
   a distal support member which is provided with an electric connection member which is electrically connected to the low voltage shield and elastically and slidably contacts the inner peripheral wall of the case, a metal member which contacts the end of the low voltage shield and is provided with a cavity open to the inner peripheral wall of the case, and a sliding member which is set between the cavity and the inner peripheral wall of the case to enclose the electric connection member and which is prepared from an elastic electrically insulating material and slidably contacts the inner peripheral wall of the case; and
   further wherein the electric connection member comprises:

a screw which is threadedly inserted into the lower voltage shield substantially toward the center of the case and is provided with a hole which is formed in substantially the same direction as that in which the thread is threadedly inserted and extends radially of the case;

elastic means held in the radially extending hole; and a contact ball which is received in the radially extending hole and is made to project from said radially extending hole by the elastic means to be pressed against the inner peripheral wall of the case.

2. The gas-insulated bus bar according to claim 1, wherein the cavity formed in the metal member comprises a flat bottom plate facing the inner peripheral wall of the case.

3. The gas-insulated bus bar according to claim 2, wherein the sliding member is set between the bottom plate of the metal member and the inner peripheral wall of the case to enclose the electric connection member.

* * * * *